Patented Sept. 26, 1944

2,359,241

UNITED STATES PATENT OFFICE 2,359,241

LIQUID GERMICIDAL COMPOSITIONS

Alexander M. Partansky, Midland, Mich., assignor to The Dow Chemical Company, Midland, Mich., a corporation of Michigan No Drawing. Application July 31, 1942,
Serial No. 453,031

8 Claims. (Cl. 167—25)

This invention relates to antiseptics and to germicides, and is particularly concerned with an improved water-miscible germicidal concentrate comprising orthophenylphenol as the principal toxic ingredient.

Orthophenylphenol and its salts are well known as bactericides. These compounds are employed in the form of dispersions, solutions, emulsions, and the like, with water, organic solvents, soaps, and oils wherever a mild germicide is required which is substantially non-toxic to humans.

Orthophenylphenol, per se, is substantially water-insoluble and is generally employed in combination with alkali, soaps, water-miscible organic solvents, and synthetic organic emulsifying and detergent agents in order that aqueous dispersions thereof may be obtained. A limitation on the use of such mixtures resides in the fact that dilutions thereof frequently are not as effective as is desirable for an all-purpose germicide. When soaps and wetting agents are employed, the germicidal effectiveness of diluted compositions is frequently lower than might reasonably be anticipated from a knowledge of the toxicity characteristics of the pure orthophenylphenol compound.

A further disadvantage in the use of orthophenylphenol containing compositions resides in their comparatively low effectiveness against Staphylococcus organisms. Thus, while many of the water-miscible concentrates comprising orthophenylphenol as the principal toxic ingredient give a satisfactory kill against such organisms as E. typhi, few, if any, have a corresponding action against Staph. aureus.

Pine oil has been used as a constituent of germicidal compositions in combination with phenolic derivatives. Here again compositions are obtained which give a satisfactory control of some organisms, but which for the most part are not satisfactory for the control of Staphylococcus organisms.

Current trends in the compounding of synthetic phenolic germicides have been toward the preparation of liquid water-miscible concentrates adapted to be diluted by the ultimate user to produce aqueous solutions and dispersions of any desired concentration. In these compositions the phenolic toxicant, e. g. orthophenylphenol, is intimately dispersed or dissolved in materials adapted to act as emulsifying and solubilizing agents therefor upon subsequent dilution with water. A representative composition might comprise orthophenylphenol in mixture with an alkali metal hydroxide, a soap or synthetic wetting and dispersing agent, and a water-miscible organic solvent, or such combination of two or more of the foregoing as is required to give a liquid germicidal material freely miscible with water. It is an object of the present invention to provide a modification of such water-miscible composition, wherein the phenolic constituent will display an increased effectiveness against such difficultly controlled organisms as Staph. aureus.

I have discovered that liquid water-miscible orthophenylphenol containing compositions as described above advantageously may be modified with a critical proportion of pine oil or alpha-terpineol. Improved compositions are thereby obtained which have the desirable properties of the known mixtures as regards stability and water miscibility and in which the toxicity of the phenolic constituent (as measured in terms of phenol coefficient against Staph. aureus) is much higher than might be expected from a knowledge of the toxicities of the components of the composition. The amount of pine oil or alpha-terpineol which is incorporated in such composition is generally between about 0.25 and 4 parts per part by weight of orthophenylphenol in the composition. In mixtures of these proportions, the apparent phenol coefficient of the orthophenylphenol is appreciably in excess of that of orthophenylphenol in unmodified compositions, and more than additive with respect to the sum total of the efficiencies of the phenol, soap, and pine oil or alpha-terpineol present in the mixture. The criticality of the foregoing proportion is evidenced by a substantial lowering of the apparent phenol coefficient of the orthophenylphenol in compositions wherein more or less than the recommended amount of the pine oil or alpha-terpineol is used.

The preferred proportion of pine oil or alpha-terpineol varies with the particular soap or other wetting agent and the amounts thereof employed in the composition. When vegetable oil soaps are a major component of the mixture, from 0.5 to 3.0 parts thereof, and from 0.25 to 3.0 parts of the pine oil or alpha-terpineol per part by weight of orthophenylphenol constitutes the preferred proportion range. With partially neutralized sulfonated vegetable oils such as castor oil, olive oil, linseed oil, etc., best results are obtained with from 0.3 to 2.5 parts of pine oil or alpha-terpineol in combination with 0.25 to 2.0 parts of the sulfonated product per part by weight of orthophenylphenol. In compositions including a synthetic emulsifying and detergent agent such as an alkali metal salt of a sulfated higher alcohol or aromatic sulfonic acid, a mixture of from 0.5 to 4.0 parts each of the emulsifying and detergent agent and pine oil or alpha-terpineol per part by weight of orthophenylphenol is most satisfactory. In any event substantial excesses of soap, synthetic emulsifying agent, and pine oil or alpha-terpineol are to be avoided if compositions of high effectiveness against Staphylococcus organisms are to be obtained.

In operating according to the invention, it is sufficient to add the required amount of pine oil or alpha-terpineol to the water-miscible germicidal concentrate with stirring. In an alternate procedure, the orthophenylphenol may be dissolved or dispersed in the pine oil or terpineol or a mixture of one or both of these with water-miscible organic solvents and the resulting liquid composition modified with soaps, wetting agents, etc. in the usual manner. The exact method of compounding is not critical provided only that there be formed a water-miscible liquid concentrate which, on dilution with water, has the milky appearance and characteristic odor of pine oil disinfectant compositions and a materially increased effectiveness against Staphylococcus organisms.

In the development of the present invention, it has been found that the improved result is peculiar to compositions including orthophenylphenol, and does not occur when many other phenolic materials are substituted therefor. Representative of the phenols which are not operable in accordance with the present invention are parachlorothymol, monochloroorthophenylphenol and monochloroparaphenylphenol. While mixtures of these phenols with pine oil have a somewhat increased effectiveness against *E. typhi*, their effectiveness against the more difficultly controlled Staphylococcus organisms does not appear to be affected.

The method employed in determining the phenol coefficients set forth in the following examples is the one developed by the United States Public Health Service, Hygienic Laboratory, and described in Circular #198 of the Food and Drug Administration, United States Department of Agriculture. These values are based upon a coefficient of 1.0 for pure phenol. The phenol coefficient of orthophenylphenol against *Staph. aureus* at 20° C. is 14 according to this method.

The following examples are not to be construed as limiting.

EXAMPLE 1

Mixtures of orthophenylphenol, alpha-terpineol, 40 per cent potassium cocoanut-oil soap, and isopropanol were prepared by mixing the several ingredients together with warming and stirring. The mixtures were then cooled and tested against *Staph. aureus* at 20° C. to determine the apparent phenol coefficient of the orthophenylphenol in each mixture. The following is representative of the results obtained:

Table I

| Parts by weight | | | Percent by weight isopropanol in composition | Apparent phenol coefficient of orthophenylphenol |
|---|---|---|---|---|
| Orthophenyl-phenol | Alpha-terpineol | 40% soap | | |
| 1 | 1 | 3 | 9.1 | 42.3 |
| 1 | 2 | 4 | 8.7 | 60. |
| 1 | 3 | 5.5 | 7.3 | 60. |
| 1 | 0 | 3 | 10.2 (plus 8% sodium hydroxide). | 31.4 |
| 0 | 1 | 2.5 | 10 (plus 6% sodium hydroxide). | Less than 0.5.[1] |

[1] Phenol coefficient for alpha-terpineol soap mixture.

Alpha-terpineol alone was found to have substantially no effect upon *Staph. aureus*.

EXAMPLE 2

In a similar manner, compositions were prepared in which a salt of a substituted aromatic sulfonic acid was substituted for the potassium cocoanut-oil soap. This synthetic emulsifier was a white hygroscopic powder of slightly aromatic odor and is available commercially as Santomerse #3. A refined pine oil was employed in place of the alpha-terpineol. The following table summarizes the composition of the various mixtures employed and the apparent phenol coefficient of orthophenylphenol therein against *Staph. aureus* at 20° C.

Table II

| Parts by weight | | | Per cent by weight isopropanol in composition | Apparent phenol coefficient of orthophenylphenol |
|---|---|---|---|---|
| Orthophenyl-phenol | Pine oil | Emulsifying agent | | |
| 1 | 0.5 | 0.5 | 20 | 30 |
| 1 | 1 | 0.5 | 16.7 | 33 |
| 1 | 2 | 1 | 20 | 42 |
| 1 | 3 | 1.5 | 18.8 | 40 |
| 1 | 4 | 2 | 18.2 | 49 |

Santomerse #3 alone was found to have substantially no effect upon *Staph. aureus*.

EXAMPLE 3

In a similar manner orthophenylphenol was compounded with pine oil and a partially neutralized sulfonated castor oil marketed as Nopco. In this operation, the pine oil and sulfonated castor oil product were mixed together and incorporated with orthophenylphenol and sufficient isopropanol to give a stable liquid concentrate. The following table sets forth the proportions of constituents employed and results obtained.

Table III

| Parts by weight per each part of orthophenylphenol | | Apparent phenol coefficient of orthophenylphenol against *Staph. aureus* |
|---|---|---|
| Pine oil | Sulfonated castor oil product | |
| 1.07 | 0.43 | 35 |
| 0.6 | 0.9 | 45 |
| 0.5 | 1.0 | 21 |
| 0.3 | 1.2 | 18 |
| 1.66 | 0.34 | 25 |
| 1.23 | 0.77 | 38 |
| 0.8 | 1.2 | 38 |
| 0.5 | 1.5 | 19 |
| 2.08 | 0.42 | 45 |
| 1.79 | 0.71 | 36 |
| 1.25 | 1.25 | 39 |
| 1.0 | 1.5 | 31 |
| 0.62 | 1.88 | 22 |
| 2.3 | 0.7 | 46 |
| 1.84 | 1.16 | 35 |

Combinations of pine oil with the sulfonated castor oil product in various proportions were found substantially without effect in the control of *Staph. aureus*.

EXAMPLE 4

Mixtures of orthophenylphenol, pine oil, and 40 per cent potassium cocoanut-oil soap were prepared substantially as described in Example 1. The following table sets forth representative compositions and the apparent phenol coefficient against *Staph. aureus* at 20° C. for orthophenylphenol in each.

Table IV

| Parts by weight | | | Percent by weight of sodium hydroxide in composition | Percent by weight of isopropanol in composition | Percent by weight of water in composition | Apparent phenol coefficient of orthophenylphenol |
|---|---|---|---|---|---|---|
| Orthophenylphenol | Pine oil | 40% soap | | | | |
| 1 | 0 | 3 | 2.0 | 10.2 | 6.1 | 31.4 |
| 1 | 0 | 7.5 | 1.0 | 10.0 | 4.0 | 28.0 |
| 1 | 0 | 9 | 0.82 | 14.4 | 2.5 | 9.8 |
| 1 | 0.25 | 3 | 1.9 | 11.43 | 5.7 | 40.0 |
| 1 | 0.25 | 9 | 0.82 | 12.35 | 2.47 | 32.8 |
| 1 | 0.5 | 3 | 1.85 | 9.25 | 5.55 | 44.9 |
| 1 | 0.5 | 9 | 0.82 | 10.27 | 2.47 | 23.1 |
| 1 | 1 | 1 | ---- | 10 | ---- | 33 |
| 1 | 1 | 2 | ---- | 9.5 | ---- | 48 |
| 1 | 1 | 3 | ---- | 9.1 | ---- | 46 |
| 1 | 1 | 4 | ---- | 8.9 | ---- | 49 |
| 1 | 1 | 8 | ---- | 12.45 | ---- | 40 |
| 1 | 1 | 9 | ---- | 6.7 | ---- | 45 |
| 1 | 2 | 1 | ---- | ---- | ---- | 44 |
| 1 | 2 | 2 | ---- | 7.4 | ---- | 52 |
| 1 | 2 | 4 | ---- | 7.1 | ---- | 39 |
| 1 | 2 | 7 | ---- | ---- | ---- | 44 |
| 1 | 2 | 9 | ---- | 11.6 | ---- | 48 |
| 1 | 2 | 10 | ---- | 9.4 | ---- | 35 |
| 1 | 2.5 | 5 | ---- | 8.6 | ---- | 36 |
| 1 | 2.5 | 10 | ---- | 11 | ---- | 39 |
| 1 | 2.5 | 15 | ---- | 9.8 | ---- | 37 |
| 1 | 3 | 8 | ---- | 8.9 | ---- | 37 |

The mixture of oil and soap was found to be not effective against *Staph. aureus*.

Example 5

Potassium linseed oil soap was substituted for potassium cocoanut oil soap as shown in the preceding example. The following table sets forth representative results obtained.

Table V

| Parts by weight | | | Percent by weight of sodium hydroxide in composition | Percent by weight of isopropanol in composition | Percent by weight of water in composition | Apparent phenol coefficient of orthophenylphenol against *Staph. aureus* at 20° C. |
|---|---|---|---|---|---|---|
| Orthophenylphenol | Pine oil | 40% soap | | | | |
| 1 | 0 | 3 | 2.0 | 10.2 | 6.1 | 29.6 |
| 1 | 0.25 | 3 | 1.94 | 9.7 | 5.83 | 33.3 |
| 1 | 1 | 3 | 1.7 | 8.47 | 5.06 | 42.5 |
| 1 | 2 | 3 | 1.45 | 7.25 | 4.35 | 37.9 |
| 1 | 3 | 4 | 1.13 | 5.62 | 3.37 | 32 |

The germicidal concentrates as set forth in the foregoing examples are diluted with water to obtain aqueous bactericidal mixtures of good stability and adapted to be employed as household disinfectants. The aqueous mixtures are also suitable for use in hospital and clinical work and may be applied to any surface upon which it is desired to control Staphylococcus organisms and particularly *Staph. aureus*. Likewise, they may be employed for the control of other organisms such as *E. typhi*, and the like.

In place of isopropanol as shown in certain of the foregoing examples, other water-miscible organic solvents may be employed, e. g. ethanol, acetone, ethylene glycol, ethylene glycol acetate, ethoxy-ethanol, methoxy-ethanol, etc. Similarly, potassium hydroxide may be substituted for sodium hydroxide. Other wetting and emulsifying agents and soaps which may be incorporated into the disclosed compositions include sodium lauryl sulfate, potassium lauryl sulfate, sodium decyl sulfate, sodium salts of sulfonated alkylphenyl-phenols, partially neutralized sulfated cocoanut oil, sodium oleate, potassium palmitate, etc. Alkaline reacting detergents such as sodium pyrophosphate, potassium pyrophosphate, sodium hexametaphosphate, and the like are also compatible with the orthophenylphenol containing compositions. Similarly dyes, perfumes, and the like may be incorporated therein.

I claim:
1. A water-miscible liquid germicidal concentrate including orthophenylphenol dispersed therein as the principal toxic ingredient and from 0.25 to 4 parts of a material selected from the class consisting of pine oil and alpha-terpineol per part by weight of orthophenylphenol.
2. A water-miscible liquid germicidal concentrate including orthophenylphenol dispersed therein as the principal toxic ingredient and from 0.25 to 4 parts of pine oil per part by weight of orthophenylphenol.
3. A water-miscible liquid germicidal concentrate including orthophenylphenol dispersed therein as the principal toxic ingredient and from 0.25 to 4 parts of alpha-terpineol per part by weight of orthophenylphenol.
4. An aqueous germicidal composition including orthophenylphenol dispersed therein as the principal toxic ingredient and from 0.25 to 4 parts of a material selected from the class consisting of pine oil and alpha-terpineol per part by weight of orthophenylphenol.
5. A water-miscible liquid germicidal concentrate including orthophenylphenol dispersed therein as the principal toxic ingredient, from 0.3 to 2.5 parts of pine oil, and from 0.25 to 2.0 parts of a partially neutralized sulfonated vegetable oil per part by weight of orthophenylphenol.
6. A water-miscible liquid germicidal concentrate including orthophenylphenol dispersed therein as the principal toxic ingredient, from 0.25 to 3.0 parts of pine oil, and from 0.5 to 3.0 parts of a vegetable oil soap per part by weight of orthophenylphenol.
7. A water-miscible liquid germicidal concentrate including orthophenylphenol dispersed therein as the principal toxic ingredient, from

0.25 to 3.0 parts of pine oil, and from 0.5 to 3.0 parts of coconut oil soap per part by weight of orthophenylphenol.

8. A water-miscible liquid germicidal concentrate including orthophenylphenol dispersed therein as the principal toxic ingredient, from 0.5 to 4 parts of pine oil, and from 0.5 to 4 parts of a synthetic emulsifying and detergent agent selected from the class consisting of the alkali metal salts of sulfated higher alcohols and aromatic sulfonic acids per part by weight of orthophenylphenol.

ALEXANDER M. PARTANSKY.